Jan. 27, 1970          A. B. RANFORD          3,491,716
MEANS FOR POSITIONING A MARKER OR OTHER OBJECT IN
TWO ORTHOGANAL AXES
Filed Nov. 24, 1967          2 Sheets—Sheet 1
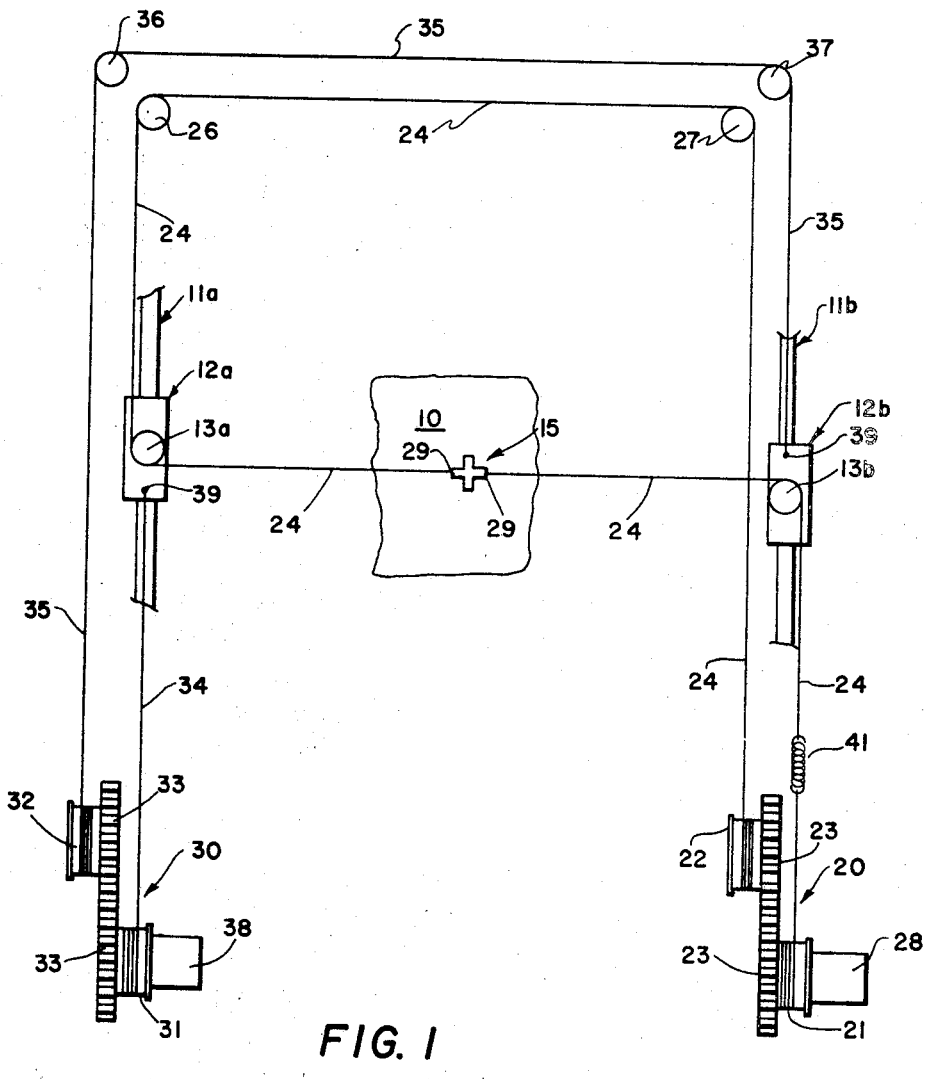
FIG. 1
FIG. 2
INVENTOR.
ALAN B. RANFORD
BY
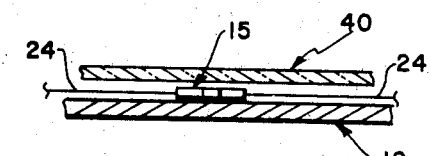
ATTORNEY

INVENTOR.
ALAN B. RANFORD

United States Patent Office 3,491,716
Patented Jan. 27, 1970

3,491,716
MEANS FOR POSITIONING A MARKER OR OTHER OBJECT IN TWO ORTHOGONAL AXES
Alan B. Ranford, Grand Rapids, Mich., assignor to Lear Siegler, Inc.
Filed Nov. 24, 1967, Ser. No. 685,451
Int. Cl. G09f 11/18
U.S. Cl. 116—129    10 Claims

ABSTRACT OF THE DISCLOSURE

A system for positioning a marker on a two-dimensional surface wherein the marker is suspended between pulleys affixed to shoes slidable along either side of the surface. The two shoes are unconnected except for a flexible cord. The flexible cord is connected to each of the slidable shoes and these cords, via a pulley and drive system, tend to pull the shoes in opposite directions, although one slackens when the other is retracted. The cord which suspends the marker, similarly, is arranged via a pulley and drive system to have its two extremities also tend to pull the shoes in opposite directions to stabilize the system. It is understood that this abstract is not to be utilized to limit the scope of this invention.

BACKGROUND

This invention relates to marker positioning systems and, more particularly, to such systems particularly adapted for the positioning of a marker upon a two-dimensional surface.

It is often necessary in vehicle display systems, position indicating systems and the like to move a marker to a specific position on a two-dimensional surface such as a plotting board in response to incoming signals representative of actual vehicle positioning or the like. For example, it may be desirable to provide within an aircraft a display surface comprising a map and to move a marker along the two orthogonal axes thereof in response to changes in the position of the vehicle as derived from the vehicle navigation and velocity monitoring systems.

While a multitude of methods and apparatus have been proposed heretofore for effective movement of the marker in response to the incoming signals, the systems which have met with any degree of success are generally expensive to build, have considerable mass and, thus, inertia, and are unable to operate accurately in the presence of heavy vibration or shock.

OBJECTS AND SPECIFICATION

It is an object of this invention, therefore, to provide a novel marker or indicator positioning system which does not inherently incorporate operational disadvantages which have been present persistently in systems previously available.

More particularly, it is an object of this invention to provide a positioning system of the type described which is operatively to positively and accurately position a marker or other object along two orthogonal axes in response to an input signal.

It is an object of this invention, thus, to provide a positioning system which may be fabricated relatively inexpensively and, yet, which is sufficiently sturdy to maintain accuracy for prolonged periods despite its subjection to heavy vibrations, shock and the like.

It is an object of this invention to provide a system of the type described wherein the system mass and, thus, its inertia is markedly reduced from that of any system previously available, thus permitting positive speedy response to incoming signals.

These as well as other objects of this invention will be readily understood by reference to the following specification and accompanying figures in which:

FIG. 1 is a schematic plan view of the novel positioning system;

FIG. 2 is a fragmentary, cross-sectional view of the marker, coordinate surface and cover plate;

Figure 3:
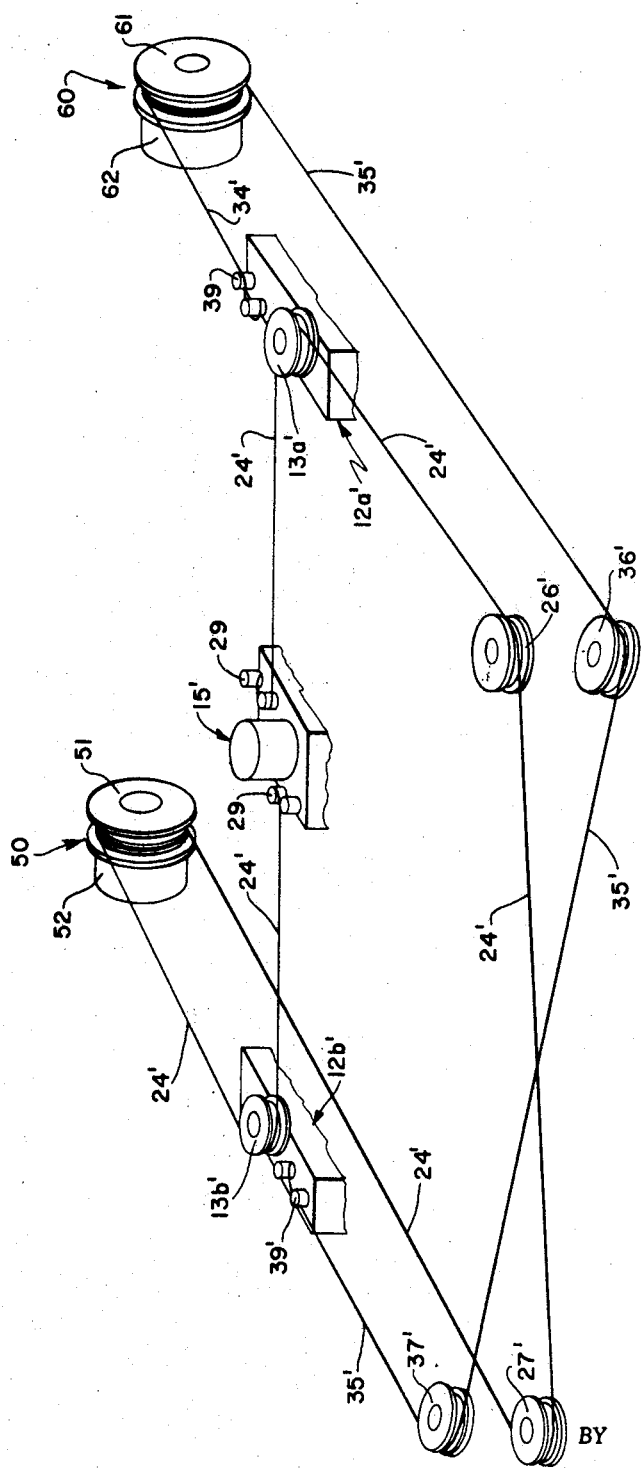
FIG. 3 is a schematic illustration of a slightly modified form of the novel positioning system.

Briefly, this invention comprises an apparatus for positioning a display indicator on a surface having support means slidably positioned at either side of the surface, each of the support means having a guide means mounted thereon. First cord means are provided extending from one end of the surface, slidably abutting each of said guide means so as to span the surface and continuing toward the opposite end of the surface. The display indicator is suspended within that segment of the first cord means spanning the surface. Second cord means are affixed to one of the support means and extend toward one end of the surface. Third cord means are affixed to the other of the support means and extend toward the other end of the surface. The second and third cord means extend from the respective support means to which they are attached in opposite directions from the first cord means. Means are provided for lengthening that segment of the first cord means extending from said one end of the surface while shortening that section continuing toward the opposite end of the surface a like lineal distance. Similarly, means are provided for lengthening the second cord means while shortening the third means a like lineal distance.

Referring now to the figures, a preferred embodiment of this invention and a minor modification thereof will be described in detail. FIGS. 1 and 2 illustrate the novel system for positioning a marker, indicated generally by the reference numeral 15, along the orthogonal axes of a surface 10. Slidably mounted on each side of the surface 10 within tracks 11a and 11b are shoes 12a and 12b. Each of these shoes has a pulley rotatably mounted thereon, shoe 12a carrying pulley 13a and shoe 12b carrying pulley 13b. In actual practice, of course, the tracks 11a and 11b will be equal in length to the length of the usable portion of the surface 10 giving shoes 12a and 12b the ability to slide along the entire length of the display surface.

The marker drive assembly, indicated generally by the reference numeral 20, comprises drive spools 21 and 22 rotatably servoed together by means of gears 23. The marker drive cord extends, after several wraps about spool 21, around the idler pulley 13b, across the surface 10, around the idler pulley 13a, toward the opposite extremity of the surface from the driving mechanism 20, around idler pulleys 26 and 27 and back to spool 22 around which it is also wrapped several times. Idler pulleys 26 and 27, as well as the idler pulleys 36 and 37 to be discussed hereinafter, are rotatably supported on the frame of the display instrument.

The shoe drive assembly, indicated generally by the reference numeral 30, comprises drive spools 31 and 32 servoed for rotation together by means of gears 33. The shoe drive cord mechanism in this particular embodiment comprises two distinct segments. Segment 34 is affixed to the shoe 12a at 39 from which it extends to the driver end of the display apparatus and is wrapped about and received by spool 31. Segment 35 emanates in wrapped-about fashion from spool 32, reaches to the opposite end of the display surface 10, passes about idler pulleys 36 and 37 and is then connected to the shoe 12b at 39 in the manner illustrated.

From an examination of FIG. 1, it will be noted that the marker cord 24 is wrapped about the shoes 12a and 12b in such a manner that, if it were to be tightened in the absence of the cords 34 and 35, the shoes would tend to slide in their respective tracks in opposite direction. The shoe drive cords 34 and 35 exert a force on the shoes 12a and 12b which is directed to counteract this tendency and, thus, after being pre-set, the shoes 12a and 12b will remain in such relative positions within the tracks 11a and 11b, respectively, that the surface-spanning segment of cord 24 always remains in approximately perpendicular position with respect to the surface 10.

The winding directions of cord 24 about spools 21 and 22 is such that, when the spools are rotated, the amount of cord fed from one spool is identical to the amount retracted by the other. Spools 31 and 32, similarly, are feed and retract oriented. The system will operate in the most desirable fashion when a tension spring, indicated schematically at 41, is inserted into the marker drive cord 24. Tension spring 41 would in actuality, of course, be either of such construction or be positioned in such a location that it would not interfere with the operation of the system. In the embodiment shown in FIG. 1, for example, spool 21 might be rotatably spring loaded with respect to its servoing gear 23.

Input signals are received at the system by reversible motors 38 and 28 which rotate spools 31 and 21 respectively. As will be seen from an examination of the system, if driving systems 20 and 30 are operated simultaneously, longitudinal movement of the marker 15 across surface 10 will occur due to the sliding of shoes 12a and 12b within tracks 11a and 11b, respectively. If the directions of simultaneous rotation are reversed, the marker 15 will move longitudinally in the opposite direction. If, on the other hand, only drive system 20 is activated, the marker will move laterally across the surface 10 in a direction determined by the direction of rotation of the motor 28. Thus, by varying the relative speeds and directions of the motors, the marker may be moved to any position to represent any type of information to which the surface 10 has been keyed.

One of the salutory features of the construction shown in FIG. 1 and, thus, of this invention, rests in the ability of the mechanism to maintain the shoes 12a and 12b in lateral alignment without physically tying them together by means of a cross piece or the like. The ability to omit the structural cross piece renders it possible to position the indicator 15 at any location upon the surface quickly due to the lower mass and, thus, the low inertia of the driving system.

The construction renders it possible, additionally, to position the indicator 15 in close proximity to either the surface 10 or the covering plate 40, ordinarily of glass, which positioning is effective to prevent rotation of the marker about the single drive cord within which it is suspended and, additionally, to snub or damp any vibrational tendencies which may occur, particularly at resonant frequencies.

The slightly modified embodiment of the invention illustrated in FIG. 3 differs from the embodiment shown in FIG. 1 only to the extent that movement is effected by the rotation of single drive pulleys. Thus, the marker drive assembly 50 comprises a single pulley 51 arranged to be rotated by reversible motor 52. The provision of the single drive pulley renders it possible to close the marker drive cord 24' over the drive pulley in endless fashion as illustrated. Similarly, the shoe drive assembly, indicated generally by the reference numeral 60, comprises a single drive pulley 61 operatively connected to the input motor 62. The two segments 34' and 35' of the shoe drive cord are joined together in endless fashion (a single high tensile cord being utilized) and looped about the drive pulley 61 one or more times as deemed necessary.

The operational characteristics of the embodiment illustrated in FIG. 3 are virtually identical to those discussed in connection with FIG. 1. Thus, for lateral movement, only pulley 51 is rotated while both pulleys 51 and 61 may be rotated as a means of achieving longitudinal movement of the marker 15'. The shoe structures, idler pulleys and stringing scheme is also identical to that described in connection with FIG. 1 with the exception, as noted, of the drive assemblies.

While a preferred embodiment of this invention along with a minor modification thereof has been illustrated in detail, it will be readily apparent to those skilled in the art that numerous other embodiments may be fabricated without departing from the spirit of this specification and the accompanying drawings. Such other embodiments are to be deemed as included within the scope of the following claims unless these claims, by their language, expressly state otherwise.

What is claimed is:

1. Apparatus for positioning a display indicator on a surface, said apparatus comprising:

support means slidably positioned at either side of said surface, each of said support means having a guiding means mounted thereon;

first cord means extending from one end of said surface, slidably abutting each of said guiding means so as to span said surface and continuing toward the opposite end of said surface, said display indicator being suspended within that segment of said first cord means spanning said surface;

second cord means affixed to one of said support means and extending toward said one end of said surface;

third cord means affixed to the other of said support means and extending toward the other end of said surface, said second and third cord means extending from the respective support means to which they are attached in opposite directions from said first cord means;

first drive means for lengthening that segment of said first cord means extending from said one end of said surface while shortening that segment of said first cord means continuing toward the opposite end of said surface a like lineal distance; and second drive means for lengthening said second cord means while shortening said third cord means a like lineal distance.

2. The apparatus as set forth in claim 1 wherein each of said support means is slidable independently of the other support means prior to the stringing of said cord means.

3. The apparatus as set forth in claim 1 wherein said guiding means comprises a pulley rotatably mounted on each of said support means.

4. The apparatus as set forth in claim 1 wherein said first drive means is positioned adjacent said one end of said surface and wherein that segment of said first cord means which continues toward the opposite end of said surface returns to said first drive means at said one end via a system of idler pulleys.

5. The apparatus as set forth in claim 4 wherein said second drive means is positioned adjacent one of the ends of said surface and wherein one of said second and third cord means returns thereto via a system of idler pulleys.

6. The apparatus as set forth in claim 1 wherein said indicator is suspended between said guiding means so as to lie in close proximity to said surface.

7. The apparatus as set forth in claim 1 which further comprises a cover plate positioned over said surface, said indicator being suspended between said guiding means so as to lie in close proximity to said plate.

8. Apparatus for positioning a display indicator on a surface, said apparatus comprising:

a shoe member slidably positioned at each side of said surface, each of the shoe members having a pulley rotatably mounted thereon;

first drive means positioned adjacent one end of said surface and first idler means positioned adjacent the other end of said surface;

second drive means positioned adjacent one end of said surface and second idler means positioned adjacent the other end of said surface;

first cord means extending from said first drive means, passing around said pulleys so as to span said surface, continuing toward said first idler means and passing thereover and returning to said first drive means, said indicator being suspended within that segment of said first cord means spanning said surface;

second cord means extending from said second drive means to one of said shoe members;

third cord means extending from said second drive means to said second idler means, passing therearound and extending toward and being affixed to the other of said shoe members, said first, second and third cord means being arranged such that each of said shoe members has balanced sliding forces exerted thereon.

9. The apparatus as set forth in claim 8 wherein said first drive means includes a pulley around which said first cord means is passed in continuous fashion.

10. The apparatus as set forth in claim 8 wherein said second drive means includes a pulley, wherein said second and third cord means are segments of one continuous cord, and wherein said one continuous cord is passed over said second drive means pulley in continuous fashion.

References Cited

UNITED STATES PATENTS

| | | | |
|---|---|---|---|
| 2,686,099 | 8/1954 | Bomberger et al | 33—1 |
| 2,746,151 | 5/1956 | Kennedy | 346—139 XR |
| 2,785,941 | 3/1957 | Macklem et al. | 33—1 XR |
| 3,396,402 | 8/1968 | De Mey. | |

LOUIS A. CAPOZA, Primary Examiner

U.S. Cl. X.R.

33—1; 116—135; 346—139